April 3, 1956   L. J. SCHILLING   2,740,422
MILKING APPARATUS

Filed Sept. 22, 1952   2 Sheets-Sheet 1

INVENTOR.
Lorell John Schilling,
BY Schroeder, Merriam,
Hofgren & Brady
Atty's.

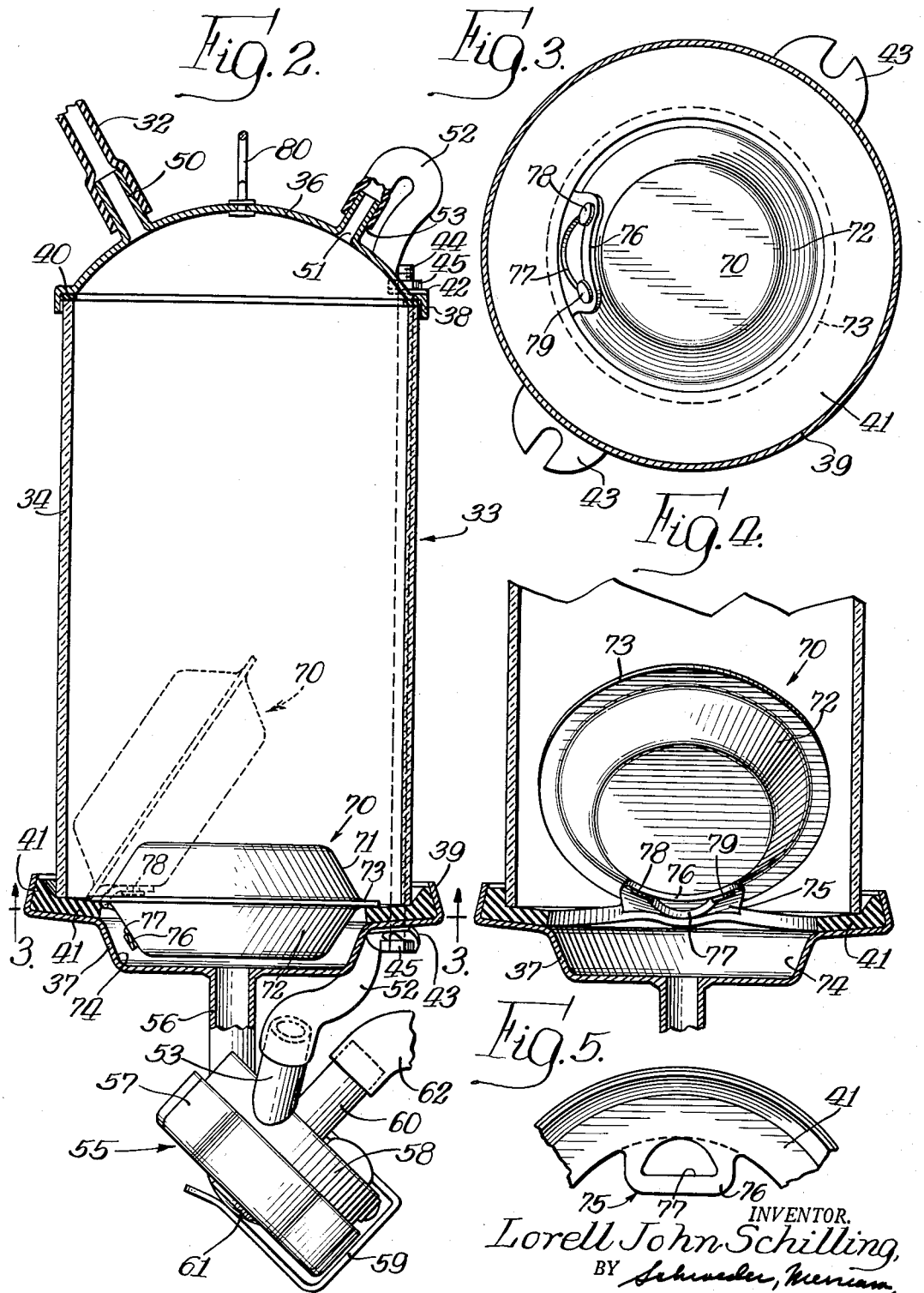

United States Patent Office 2,740,422
Patented Apr. 3, 1956

2,740,422
MILKING APPARATUS

Lorell John Schilling, Galesville, Wis., assignor to Schilling Electric Company, a corporation of Wisconsin Application September 22, 1952, Serial No. 310,817

6 Claims. (Cl. 137—399)

This invention relates to a float valve and more particularly to a float valve adaptable for use in a milking system for use in milking cows.

One feature of this invention is that it provides an improved milking apparatus. A further feature of the invention is the provision of a container into which milk withdrawn from a cow is temporarily delivered and to provide such a container with means for withdrawing milk therefrom by vacuum, together with automatically operated means serving to block off the vacuum line when substantially all the milk is withdrawn from the container. Another feature of the invention is the provision for blocking off the vacuum line by a float valve which is so constructed that it is designed to resist premature closing by the vortexing action of the withdrawing milk. Yet another feature of this invention is the provision of a float valve which not only prevents the outflow of air following the milk into the vacuum line, but is easily removable for cleaning purposes.

Other and further features will be readily apparent from the following disclosure and drawings, in which:

Figure 2 is a vertical sectional view through a milk container embodying the float valve of the invention;

Figure 3 is a horizontal section taken along line 3—3 of Figure 2;

Figure 4 is a fragmentary sectional view of the lower portion of the milk chamber of Figure 2 showing the float valve in open position; and Figure 5 is a fragmentary view of the seat for the valve showing the means for securing the float thereto.

Figure 1:
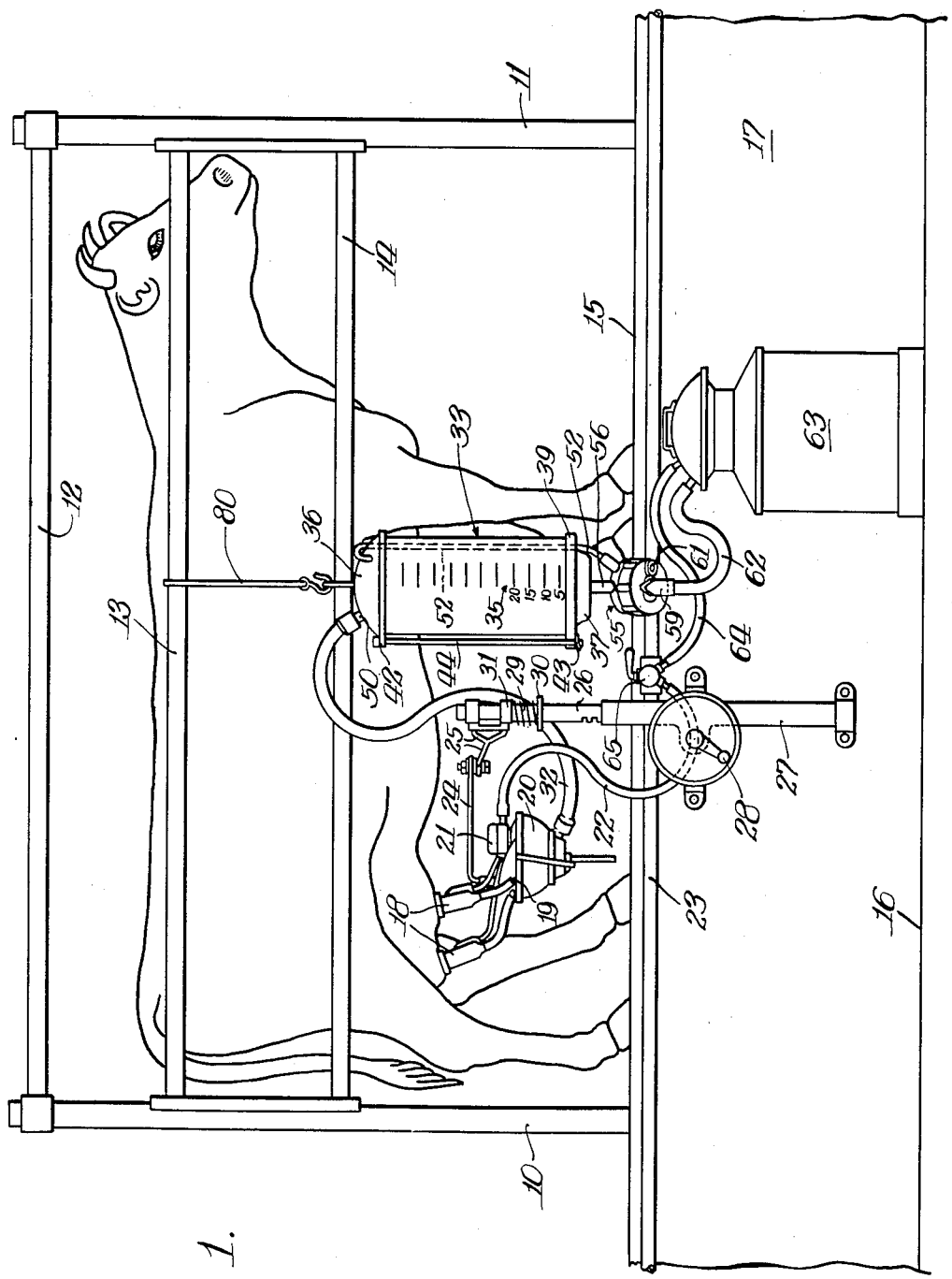
Figure 1 is a side elevation of a part of a milking parlor showing a portion of a single stall and associated milking apparatus embodying the invention.

While this invention is susceptible of embodiments in many different forms, there is shown in the drawings and will herein be described in detail one specific embodiment, with the understanding that the present disclosure is to be considered as an exemplification of the principles of the invention and is not intended to limit the invention to the embodiment illustrated. The scope of the invention will be pointed out in the appended claims.

In the particular embodiment of the invention illustrated here, the milking parlor in connection with which it is disclosed is illustrated as employing the "drop" system, with the floor of the cow's stall being at a higher level than the operator's floor or alley, as may be best seen in Figure 1. Milking parlors of this general type are more fully described in a number of issued patents and other pending applications and references may be had, for example, to Babson et al. Reissue Patent No. 22,368, and Babson et al. Patent No. 2,477,035 to supplement the present disclosure with respect to the general features of such milking parlors and stalls. In such milking parlors the cows, after any desired preliminary washing of the udder or other preparation, are admitted to a stall, as for example the stall shown in Figure 1 which includes the vertical uprights 10 and 11, the overhead horizontal bracing member 12, and the side horizontal members 13 and 14. It will be understood that the vertical uprights and horizontal bracing members form a rectangle about the cow therein. The stall illustrated is shown in simplified form without a feed chute, or other operating equipment for convenience and simplicity of illustration.

The cow stands on a floor 15 which would be at some suitable level (for example, 2 feet) above an operator's floor or alley 16. A vertical wall 17 extends between the two floor levels.

The milking apparatus with which the present invention is particularly adapted for use and the apparatus herein illustrated and described is of the kind sometimes known in the trade as "carry-away" to distinguish it from a milking machine which receives a given amount of milk directly and which must be emptied between applications to each cow. The system illustrated herein is of a character which can be attached to cows as they move into a stall of a milking parlor and which will deliver milk to a tube or pipe adapted to transport it to any desired point remote from the actual milk withdrawing apparatus or milker. The desired point may be a milk can immediately adjacent the stall or at some remote point, such as storage tanks, coolers, pasteurizers or the like. The general character and nature of such a system will only be described here to such an extent as is necessary to enable an understanding of the proper relationship to the remainder of the system of the particular improvement to which this application is directed. Should it be desired to supplement the present disclosure with reference to the milking system in general, reference may be had to the Thomas application, Serial No. 127,047 now abandoned and 208,869 filed respectively on November 14, 1949, and February 1, 1951, and to the Babson application Serial No. 171,380 filed June 30, 1950 now Patent No. 2,631,636.

In general as may be seen by reference to Fig. 1, the milking system includes four teat cup assemblies of identical character herein identified as 18. The four teat cup assemblies may be connected together in any way desired to deliver milk to a single flow passageway and the cup assemblies are here shown as having their milk tubes connected to nipples on a lid 19, this lid forming the top of a milk receiving chamber of substantial size, the remainder of the chamber being provided by a bowl-shaped element 20. The lid carries a pulsator 21 of a well-known type conventional in the field to which vacuum is applied by means of a flexible hose connection 22 connected into a common vacuum line 23 which extends alongside of the milking parlor. The entire bowl assembly is supported by an apparatus including a pair of pivotally interconnected arms 24 and 25 supported on a vertical adjustable post 26.

The particular adjustable supporting arrangement is of a type more fully shown and described in Babson et al. Reissue Patent No. 22,368. The part 26 may be vertically adjusted to any desired position by telescopic movement within a tube 27 in turn suitably mounted on the wall 17 and relative movement between the post 26 and tube 27 may be achieved through a rack and gear arrangement operated by the handle 28. A spring 29 encircles the part 26 and has one end bearing against a collar 30 fixed to the post and has its other end bearing against a sleeve member 31 slidable on the rod and supporting the pivotal arm arrangement 24 and 25. Appropriate adjustment of the height of the support provides a downward and forward intermittent tug and pull on the teats during milking with the intermittent effect being due to the pulsator action.

Milk drawn in the bowl 20 is drawn therefrom through a flexible hose connection 32 into a container generally designated 33 wherein it is retained until the milking is completed.

As best shown in Figs. 2 and 3, the container 33 comprises a cylindrical member 34 preferably made of transparent plastic material which may be provided with graduations 35. The member 34 is closed at its top by a removable metal domed closure member 36 and at its bottom by a circular closure member 37. Each of the closure members 36 and 37 are provided with turned flanges 38 and 39 respectively about their outer peripheries to form a retainer for annular resilient sealing members 40 and 41 which provide a fluid-tight connection between the end closures and the cylindrical member 34. The upper closure 36 is provided with two outstanding ears or lugs, one of which is shown at 42, adapted to be aligned with corresponding lugs 43 on the lower closure with each of the lugs being provided with apertures through which rods 44 extend to secure the end closures in place in fluid-tight relationship with the ends of the cylindrical container 33. Preferably the rods are secured in the lugs 42 and 43 by bolts 45 as shown. By loosening the bolts the top and bottom closures may be removed and the entire apparatus may be cleaned with ease.

The upper closure 36 is provided with a pair of nipples 50 and 51 opening into the container 33 above the highest level of liquid therein. The flexible hose 32 connected to the milking assembly is secured to the nipple 50 while a second flexible hose 52 is connected at one end to the nipple 51 and at the other end to one port 53 of a three-way valve 55 which is connected to the bottom closure member 37 by means of a pipe member 56.

The three-way valve 55 is provided with a rotatable part 57 adapted to establish communication between various ports in the valve. The valve itself includes a body portion 58 readily separable from the movable part 57 for cleaning and held in assembled relationship by a spring clip 59. In addition to the port 53 on the valve there is provided a second port 60 and a sampling outlet 61. In one position of rotation of the part 57 communication is established through the valve between the ports 53 and 60, with the latter port being connected by a flexible tube 62 to the lid of a milk can 63. In this first position the pipe 56 is blocked off by the valve so that vacuum applied to the interior of the milk can through a hose 64 connected to the vacuum line 23 can be applied to the interior of the chamber 33. In a second position of rotation of the part 57 the port 53 is open to the atmosphere and the pipe 56 is connected through the valve to the port 60 permitting milk in the container to be withdrawn into the milk can 63. In a third position the pipe 56 is connected to the sampling outlet 61 so that a small sample of the milk can be withdrawn.

The entire container 33 including the valve member 55 is suspended in vertical position by the hanging means 80 which is secured to a metal loop fixed to the upper end closure 36, or, if it is desired to weigh the milk delivered, the chamber and attendant apparatus may be suspended from a scale.

In operating the apparatus so far described, the teat cups are attached to the cow as illustrated in Fig. 1 and the valve 65 on the vacuum line opened to apply vacuum to the pulsator 21 and to the milk can 63. The valve device 55 is moved to a position in which vacuum is applied to the interior of the container 33 through the port 53 and the tube 52 to draw milk through the nipple 50 into the container. With the valve 55 so positioned the pipe 56 is blocked so that the milk is retained in the container. Upon completion of the milking the operator need only to glance at the scale on the container to read off the pounds of milk delivered by the cow and also to inspect for foreign matter, such as dirt, blood and the like, which may have inadvertently become mixed with the milk.

Having completed the inspection the operator may turn the valve device 55 to a position which connects the pipe 56 with the port 60 to draw milk from the container. With the valve in this position the port 53 is connected, through the valve, to the atmosphere so that air may be admitted to the container as the milk is withdrawn.

As milk is drained from the container 33 through the line 61 it is clear that after all the milk has been withdrawn air would then be admitted to the line unless means were provided for blocking off the outlet pipe 56. It is, of course, undesirable that air be admitted into the vacuum line as such air serves to destroy the vacuum and thence would cause a cessation of milking. In order to avoid the necessity of having an operator standing by each container to shut off the valve as soon as the container is empty, there is provided float valve means which operates automatically when substantially all of the milk is withdrawn to shut off the vacuum.

As the milk is withdrawn from the container 33 it has a tendency to vortex and it has been found that free floating valves such as ball valves are, in the absence of floating valves such as ball valves are, in the absence of some form of guard means, apt to be drawn into the vortex to close the outlet prior to the withdrawal of all of the milk from the container. When this occurs it not only interrupts the withdrawal operation, but also gives rise to the problem of unseating the ball float against the weight of the liquid retained in the container.

It has been found that by providing a float valve designed so as to have a transverse diameter substantially in excess of the diameter of the vortex, so that buoyant portions of the valve are always positioned in the milk, will serve to retain the valve in open position so long as there is milk within the container.

Accordingly the container is provided with a float valve 70 adjacent the bottom of the container. The valve is formed of a pair of substantially pie-pan-shaped disks 71 and 72 secured together along their edges to form a hexagonal float whose side walls are V-shaped in cross section and meet in a peripheral rim 73. The rim 73 has a diameter such as to seat along the inner edge of the annular resilient seal 41 to seal off the outlet pipe 56. To permit the float valve 70 to move to the closed position shown in solid lines in Fig. 2 the bottom closure 37 is provided with a downwardly dished portion 74 conforming generally to the shape of the lower member 72.

The float valve 70 is rockably mounted within the container and to this end there is secured to the lower sealing ring 41 an integral looped portion 75 which, as best shown in Figs. 4 and 5, comprises a relatively thin flat tongue portion 76 having a half-moon-shaped cut out portion 77, the corners of which are adapted to engage lips provided on a pair of button-like fastening means 78 and 79 secured to the lower disk member 72. The described connection between the looped portion 75 and fastening means 78 and 79 permits ready removal of the float for cleaning and the resilience of the looped portion (which is preferably made of rubber, serves to retain the float 70 in proper position relative to the sealing ring 41. The looped portion is flexible enough to permit the float to rock with the vortexing milk during the milk withdrawal operation.

During the first operation of the milking process when milk is drawn into the container 33 the float valve 70 is free to float upwardly to the position shown in dotted lines in Fig. 2 leaving the outlet pipe 56 uncovered. It is of course understood that during this filling operation the valve 55 is positioned so as to block the outlet pipe and retain the milk in the container. When the milking operation has been concluded the total milk withdrawn may be weighed such as through the use of a scale connected to the pendant 80 which suspends the container and, if desired, a sample of the milk may be withdrawn by rotating the valve 55 to the proper position. When it is desired to drain off the milk from the container to the milk can 63, the valve part 57 is again rotated to open the outlet pipe 56 and connect the same to the port 60 for withdrawal into the can 63. As the milk is withdrawn the float valve 70 remains in the open (dotted line) position of Fig. 2 and is gradually lowered therefrom as the level of the milk reaches the float. If, during the withdrawal of the milk, a vortex is formed therein the flexible, and hence rockable, mounting of the float valve permits it to rock with the spinning milk. Apparently the float aligns itself with the downwardly spiraling path traveled by the milk particles and thus no downward closing force is exerted on the top of the float. Thus the float, in effect, "slips" the forces of the vortex which tend to move it toward closed or seated position. Furthermore, the diameter of the two buoyant parts 71 and 72 are preferably in excess of the diameter of any vortex which would be formed within the container 33 and so at all times during the withdrawal of milk buoyant portions are positioned in the milk beyond the diameter of the vortex, which portions serve to retain the float valve in open position. When all of the milk has been withdrawn the float valve of course assumes the solid line position of Fig. 2 quite effectively closing off the outlet pipe 56 and thus prevents air from being drawn into the vacuum system of the milking apparatus.

I claim:

1. In a milking apparatus of the character described, milk storage apparatus comprising a container having an outlet at the bottom thereof, a valve seat surrounding the outlet, a float valve, mounting means for flexibly mounting the float valve adjacent the outlet, said mounting means permitting said float valve to pivot about a substantially horizontal axis and to permit limited rocking movement of the float valve while in open position to permit said float valve to align itself with the downwardly spiralling milk moving toward said outlet, with said float valve having a buoyant portion of a diameter greater than the diameter of a vortex formed in the milk as the same is withdrawn, whereby to position a buoyant portion of the float in the withdrawing milk sufficient to maintain the float valve in open position in opposition to the action of the vortex, with said float being adapted to close by gravity and sealingly to engage the seat upon the withdrawal of substantially all of the milk.

2. In a milking apparatus of the character described, milk storage apparatus comprising a container adapted to store milk delivered from a cow and having an outlet at the bottom thereof, a resilient ring removably seated in the bottom of the container and surrounding the outlet, a float valve having a radially extending thin flat rim around the periphery thereof, and resilient means rockably securing the float valve adjacent the outlet, with said float valve being adapted to be buoyantly opened by non-vortexing milk within the container and to close by gravity upon the withdrawal of milk with said rim seating upon the ring to close the outlet.

3. In a milking device having a container to store milk delivered from a cow, apparatus of the character described comprising a base member adapted to be removably secured to the bottom of the container and having an outlet therein; a resilient ring removably held in the base member with the ring having a first portion adapted sealingly to engage the container and a second portion forming a seat surrounding the outlet; a member having a circular top, a circular bottom and annular side walls, V-shaped in cross-section, joining the top and bottom to provide therewith a hollow float having a buoyant portion of a diameter greater than the diameter of a vortex formed in the milk as the same is withdrawn; an annular rim extending around the side walls of the float to engage the seat, and means resiliently securing the float to the ring.

4. In a milking device having a cylindrical container adapted temporarily to store milk delivered from a cow, apparatus of the character described comprising a base member adapted to be removably secured to the bottom of the container and having an outlet at the center thereof; an inwardly inclined annular rim on the base member; a resilient annular member removably held within said rim and having a first portion adapted sealingly to engage the bottom of the container and having a second portion forming a valve seat surrounding the outlet; a member having a circular top, a circular bottom and an annular side wall joining the top and bottom to provide therewith a float having a portion adapted to engage the seat; an integral flexible loop formed in said ring; and fastening means on the float for engaging the loop rockably to secure the float to the ring.

5. In a milking device having a container temporarily to store milk delivered from a cow, apparatus of the character described comprising a base member adapted to be removably secured to the bottom of the container; an outlet in the base member; an annular inwardly inclined rim on the base member; a resilient annular valve seat removably held in said rim and having a portion adapted sealingly to engage the bottom of the container; a float valve comprising a pair of pie-pan-shaped circular disks fastened together along their edges to provide a hollow float of hexagonal cross-section and with a radially extending thin flat rim around the periphery of the float with said float having a buoyant portion of a diameter greater than the diameter of a vortex formed in the milk as the same is withdrawn, said base member having a recessed bottom adapted to receive the lower portion of the float valve therein, with said float valve being adapted to close by gravity on the seat; an integral flexible loop portion formed on the seat, and spaced fastening means secured to the float valve each provided with lip portions for engaging the loop rockably to secure the float valve to the ring.

6. In a milking device having a cylindrical container adapted temporarily to store milk delivered from a cow; apparatus of the character described comprising a circular base member adapted to be removably secured to the bottom of the container; an annular inwardly tapered rim on the base member; a resilient annular valve seat removably held in said rim and having a portion adapted sealingly to engage the bottom of the container; a float valve comprising a pair of pie-pan-shaped circular disks contacting each other along their edges to provide a hollow float having a hexagonal cross-section and a radially extending thin flat rim, said base member having a recessed bottom corresponding in shape to one of said disks to permit the entrance thereof when said rim is seated on the valve seat, said float having a buoyant portion of a diameter greater than the diameter of a vortex formed in milk withdrawing from the chamber whereby the float valve is buoyed up by a volumetric displacement of milk sufficient to resist premature closing by the vortexing action; an integral flexible loop portion formed on the seat, and spaced fastening means secured to the float each provided with lip portions for readily removably engaging the loop rockably to secure the float to the ring.

References Cited in the file of this patent

UNITED STATES PATENTS

| | | |
|---|---|---|
| 265,310 | Dyer | Oct. 3, 1882 |
| 1,972,144 | Hapgood | Sept. 4, 1934 |
| 2,021,591 | Corderoy | Nov. 19, 1935 |
| 2,112,630 | Marshall | Mar. 29, 1938 |